US012747795B2

(12) United States Patent
Mccarra

(10) Patent No.: US 12,747,795 B2
(45) Date of Patent: Sep. 29, 2026

(54) COMPACT SLAB GATE VALVE SYSTEMS AND METHOD OF USE

(71) Applicant: SCV Valve, LLC, Santa Fe, TX (US)

(72) Inventor: Sidney Mccarra, League City, TX (US)

(73) Assignee: SCV Valve, LLC, Santa Fe, TX (US)

( * ) Notice: Subject to any disclaimer, the term of this patent is extended or adjusted under 35 U.S.C. 154(b) by 1 day.

(21) Appl. No.: 18/736,057

(22) Filed: Jun. 6, 2024

(65) Prior Publication Data

US 2025/0377043 A1 Dec. 11, 2025

(51) Int. Cl.
*F16K 3/02* (2006.01)
*F16K 27/04* (2006.01)

(52) U.S. Cl.
CPC .......... *F16K 3/0281* (2013.01); *F16K 3/0236* (2013.01); *F16K 27/044* (2013.01)

(58) Field of Classification Search
CPC .... F16K 3/0209; F16K 3/0218; F16K 3/0236; F16K 3/0245; F16K 3/0281; F16K 3/16; F16K 3/312
See application file for complete search history.

(56) References Cited

U.S. PATENT DOCUMENTS 2,596,817 A * 5/1952 Mcgovney .............. F16K 25/04 251/123
2,883,148 A * 4/1959 Williams .................. F16K 1/52 251/327
3,636,971 A * 1/1972 Hagar ................... F16K 3/0281 251/205
5,090,661 A * 2/1992 Parks, Jr. .............. F16K 3/0227 251/174
5,137,261 A * 8/1992 Clifford .................. F16K 35/06 251/328

(Continued)

FOREIGN PATENT DOCUMENTS

CN 108662179 A * 10/2018 ............... B08B 7/00
CN 109578604 A * 4/2019 ............. F16K 3/312

(Continued)

OTHER PUBLICATIONS

Machine English translation of CN_108662179 (Year: 2025).*

(Continued)

*Primary Examiner* — Hailey K. Do
(74) *Attorney, Agent, or Firm* — Bookoff McAndrews, PLLC

(57) ABSTRACT

A gate valve system may include a downstream end and an upstream end with a flow path extending through the downstream end and the upstream end. A gate valve system may include a gate extending within the body with a downstream surface facing the downstream end and an upstream surface facing the upstream end. A gate valve system may include a stem secured to the gate and configured to actuate the gate between a first position in which a flow of fluid is permitted between the downstream end and the upstream end and a second position in which the flow of fluid is prevented. A gate valve system may include a downstream seat assembly contacting the downstream surface and an upstream seat assembly contacting the upstream surface, wherein each of the downstream seat assembly and the upstream seat assembly includes a spring member.

18 Claims, 5 Drawing Sheets

(56) References Cited

U.S. PATENT DOCUMENTS

| | | | | | |
|---|---|---|---|---|---|
| 5,445,359 | A * | 8/1995 | Beson | F16K 3/207 251/167 |
| 6,009,899 | A * | 1/2000 | Polutnik | F16K 31/508 251/249.5 |
| 7,431,264 | B2 * | 10/2008 | Leroux | F16K 3/0281 251/118 |
| 10,900,572 | B2 * | 1/2021 | Binder | F16K 3/0236 |
| 10,969,023 | B2 * | 4/2021 | Mcguire | F16K 3/0236 |
| 2009/0095934 | A1 * | 4/2009 | Cain | F16K 3/0227 251/329 |
| 2009/0223661 | A1 * | 9/2009 | Khazanovich | E21B 33/02 166/93.1 |

FOREIGN PATENT DOCUMENTS

| | | | | |
|---|---|---|---|---|
| CN | 111006031 | A * | 4/2020 | F16K 31/53 |
| GB | 111631 | A * | 12/1917 | F16K 3/0209 |
| GB | 1260114 | A * | 1/1972 | F16K 3/0281 |

OTHER PUBLICATIONS

Machine English translation of CN_109578604 (Year: 2025).*
Machine English translation of CN_111006031 (Year: 2025).*
"Thru Conduit Slab & Expanding Gate Valves—API 6A & API 6D", pp. 1-40, <https://www.scvvalve.com/uploads/5/5/7/2/5572344/scv_thruconduitgate_110921_ebrochure.pdf>.

* cited by examiner

COMPACT SLAB GATE VALVE SYSTEMS AND METHOD OF USE

TECHNICAL FIELD

Aspects of the present disclosure relate generally to valves and valve systems useful, for example, for fluid handling. In particular, aspects of the present disclosure relate to methods and systems for gate valves.

BACKGROUND

Valve devices, such as gate valve assemblies, are useful for fluid handling in, for example, the oil and gas, power, chemical, water works, waste water, and manufacturing industries. Gate valve systems in particular are useful to selectively permit or block the flow of large volumes of fluid. Gate valves are robust systems that operate in harsh environments and under severe conditions. In order to perform in these environments, valve systems not only include components that are resistant to debris, corrosion, and wear, but also have high tolerance for significant loads, pressures, etc. The harsh environment can make it challenging to service the valve in-line. At the same time, valves often adhere to strict dimensional limitations for the environment it is used for. Because of this, conventional gate valves struggle to withstand the stresses of and physically fit within certain environments.

Additionally, under some circumstances, the pressure within the gate valve can cause the seats to become displaced and improperly seal. Some gate valves address this problem by ensuring the gate counteracts the pressure and keeps the seats in place. However, this increases the dimensions of the gate valve as the gate is required to be larger to keep continual contact against the seat. Thus, there is a need for gate valves that can fit within strict dimensional requirements and, at the same time, properly perform under high pressure environments.

SUMMARY

In some aspects, the techniques described herein relate to a gate valve system, including: a body including: a downstream end; an upstream end; and a flow path extending through the downstream end and the upstream end; a gate extending within the body with a downstream surface facing the downstream end and an upstream surface facing the upstream end; a stem secured to the gate and configured to actuate the gate between a first position in which a flow of fluid is permitted between the downstream end and the upstream end and a second position in which the flow of fluid is prevented; and a downstream seat assembly contacting the downstream surface and an upstream seat assembly contacting the upstream surface, wherein each of the downstream seat assembly and the upstream seat assembly includes a spring member.

In some aspects, the techniques described herein relate to a gate valve system, wherein an outer surface of the body includes one or more ribs surrounding the body.

In some aspects, the techniques described herein relate to a gate valve system, further including: a yoke, the yoke being removable while the gate valve system is in service.

In some aspects, the techniques described herein relate to a gate valve system, each of the downstream seat assembly and the upstream seat assembly further including: a seat; a seat insert configured to contact the gate and prevent contact between the gate and the seat; and an O-ring.

In some aspects, the techniques described herein relate to a gate valve system, wherein the spring member is a stacked wave disc wave spring.

In some aspects, the techniques described herein relate to a gate valve system, wherein the gate surrounds less than 50% of a periphery of the flow path when in the first position.

In some aspects, the techniques described herein relate to a gate valve system, including: a body including: a downstream end; an upstream end; and a flow path extending through the downstream end and the upstream end; a gate extending within the body with a downstream surface facing the downstream end and an upstream surface facing the upstream end; and a stem secured to the gate and configured to actuate the gate between a first position in which a flow of fluid is permitted between the downstream end and the upstream end and a second position in which the flow of fluid is prevented between the downstream end and the upstream end, wherein the entire flow path at the downstream end is in fluid communication with the entire flow path at the upstream end in the first position; wherein the gate only partially surrounds the flow path in the first position.

In some aspects, the techniques described herein relate to a gate valve system, wherein a distance from an outer circumference of the flow path to a bottom surface of the body is less than a radial distance defined by a center of the flow path to the outer circumference of the flow path.

In some aspects, the techniques described herein relate to a gate valve system, wherein the gate extends from a top end to a bottom end, wherein the stem is secured to the gate at the top end, and wherein the bottom end includes a first portion that is straight, a second portion that is straight, and an arc portion that is curved between the first portion and the second portion.

In some aspects, the techniques described herein relate to a gate valve system, the gate valve system further including: a downstream seat assembly contacting the downstream surface and an upstream seat assembly contacting the upstream surface.

In some aspects, the techniques described herein relate to a gate valve system, each of the downstream seat assembly and the upstream seat assembly including: a wave spring; a seat insert configured to contact the gate; a seat configured to contact the gate at least when the seat insert is not present; a seal; and packing material.

In some aspects, the techniques described herein relate to a gate valve system, wherein the gate valve system is a double block and bleed valve system.

In some aspects, the techniques described herein relate to a gate valve system, wherein the packing material is formed as ropes made of graphite.

In some aspects, the techniques described herein relate to a gate valve system, wherein an outer surface of the body includes one or more ribs surrounding the body.

In some aspects, the techniques described herein relate to a method of assembling a gate valve system, the method including: forming a body including a downstream end, an upstream end, and a flow path extending through the downstream end and the upstream end; placing a gate within the body, the gate having a downstream surface facing the downstream end and an upstream surface facing the upstream end; coupling a stem to the gate, the stem being configured to actuate the gate between a first position in which a flow of fluid is permitted between the downstream end and the upstream end and a second position in which the flow of fluid is prevented between the downstream end and the upstream end; and forming a downstream seat assembly contacting the downstream surface and an upstream seat assembly contacting the upstream surface, wherein each of the downstream seat assembly and the upstream seat assembly includes a wave spring.

In some aspects, the techniques described herein relate to a method, wherein the entire flow path at the downstream end is in fluid communication with the entire flow path at the upstream end in the first position, and wherein the gate partially surrounds a perimeter of the flow path in the first position.

In some aspects, the techniques described herein relate to a method, wherein an outer surface of the body includes one or more ribs surrounding the body.

In some aspects, the techniques described herein relate to a method, the method further including: forming a yoke, the yoke being removable while the gate valve system is in service.

In some aspects, the techniques described herein relate to a method, each of the downstream seat assembly and the upstream seat assembly further including: a seat insert configured to contact the gate; a seat configured to contact the gate at least when the seat insert is not present; an O-ring; and packing ropes.

In some aspects, the techniques described herein relate to a method, wherein a distance from an outer circumference of the flow path to a bottom surface of the body is less than a radial distance defined by a center of the flow path to the outer circumference of the flow path.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms “comprises,” “comprising,” “having,” including,” or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, “about,” “substantially,” “generally,” and “approximately” are used to indicate a possible variation of +10% in the stated value.

Figure 1:
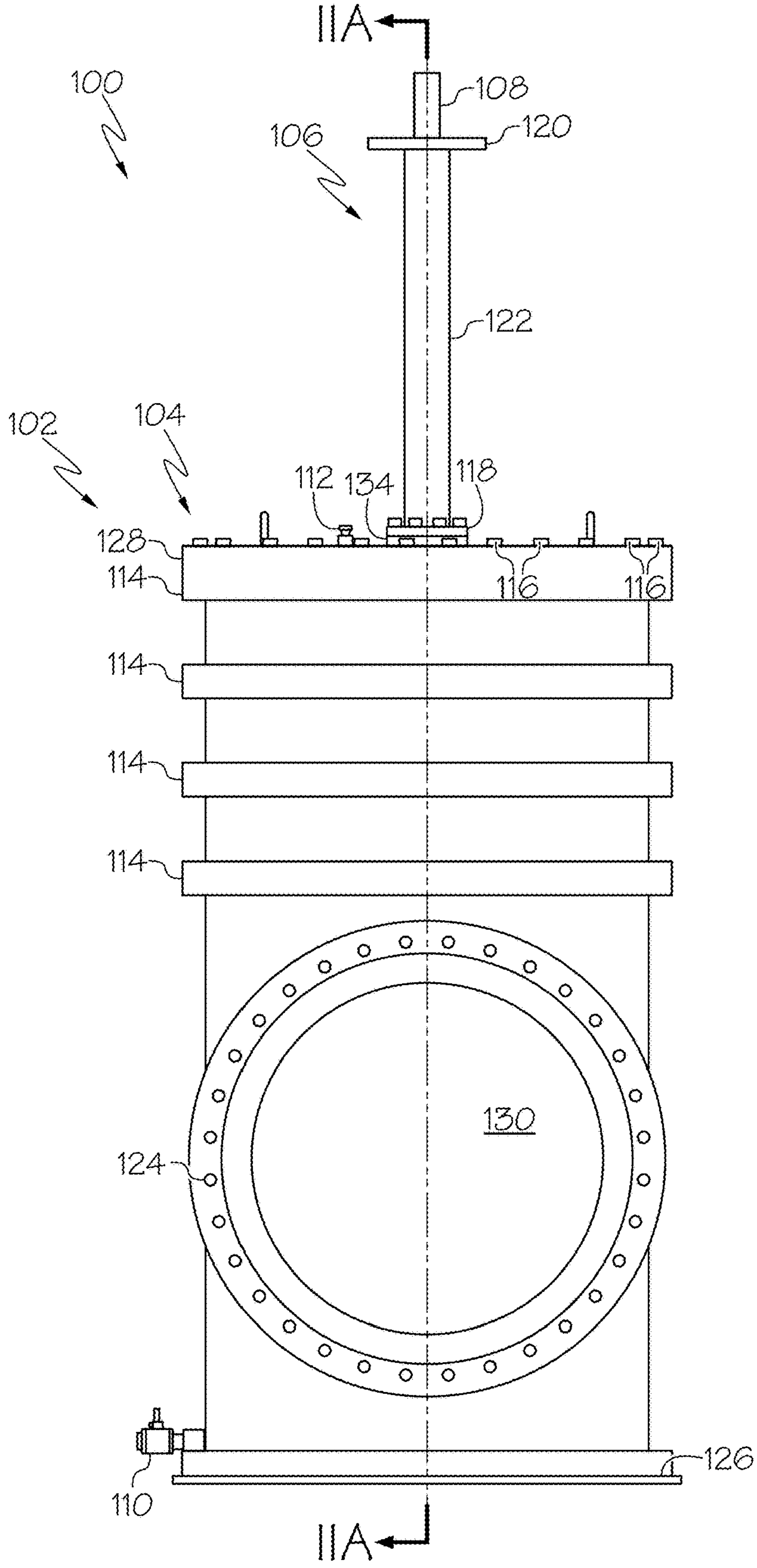
FIG. 1 is a front view of a gate valve assembly according to an aspect of the present disclosure.

FIG. 1 is a front view of a gate valve assembly 100 (or gate valve system) according to aspects of the present disclosure. Specifically, gate valve assembly 100 may be considered a compact gate valve or compact slab gate valve. Gate valve assembly 100 may include a body 102, a bonnet 104, a yoke 106, and a stem 108. Body 102 may extend from a downstream end 202 (FIG. 2A) having an annular flange or downstream port 124 and an upstream end 204 (FIG. 2A), and include a top portion 128 to which bonnet 104 is secured.

Figure 2A:
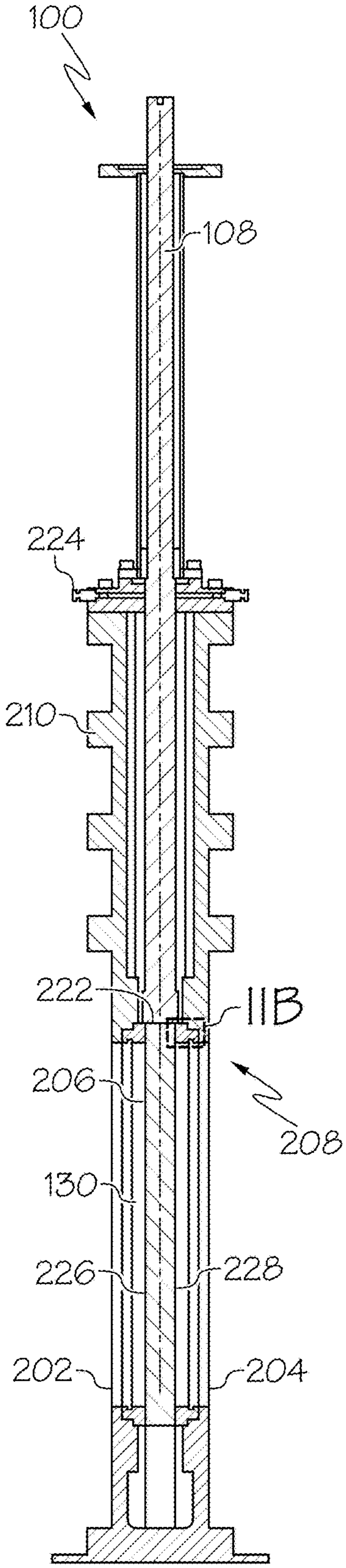
FIG. 2A is a cross-sectional view along line IIA-IIA of FIG. 1.
Figure 3:
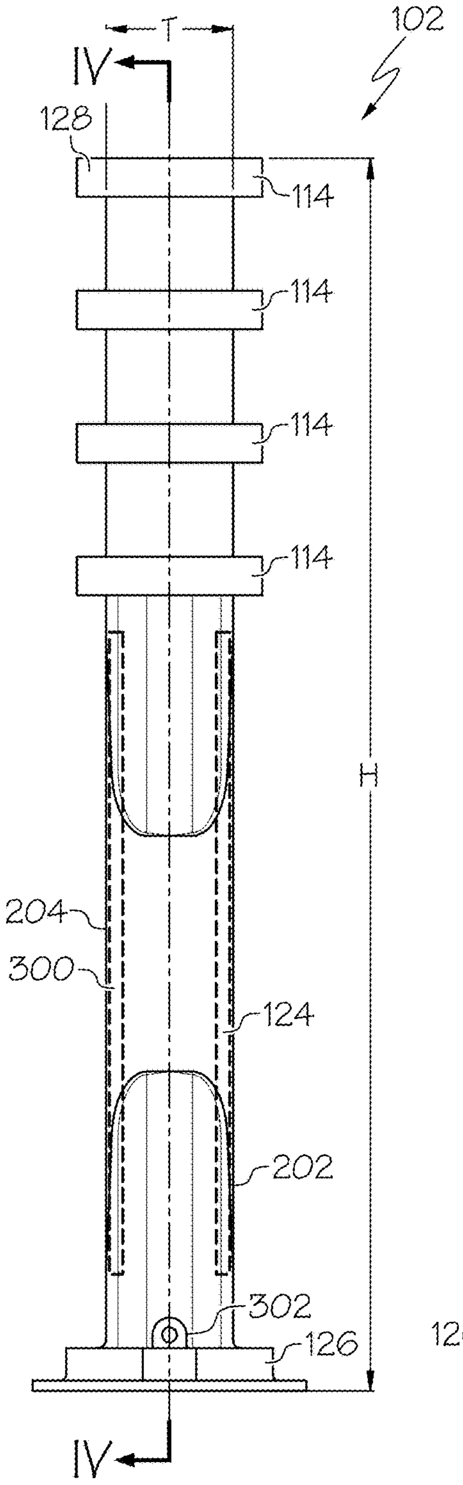
FIG. 3 is a side view of the gate assembly of FIG. 1.

Body 102 may additionally include an annular flange or upstream port 300 (FIG. 3), a base portion 126, a flow path 130, a valve 110, one or more ribs 114, walls 210 (FIG. 2A), and a valve fitting 302 (FIG. 3). Stem 108 may extend through bonnet 104 and the top portion 128 of body 102 to couple with gate 206 (FIG. 2A) at coupling 222 (FIG. 2A). Yoke 106 may circumferentially surround a substantial portion of stem 108 that extends above top portion 128. Yoke 106 may include a base portion 118 that interfaces with bonnet 104, a top portion 120, and a body portion 122 extending therebetween. Yoke 106 may be removable while the gate valve assembly 100 is in service. For example, due to the way yoke 106 surrounds stem 108 and couples with bonnet 104, yoke 106 may be removed, repaired, replaced, etc. when gate valve assembly 100 is connected to a larger valve system (e.g., downstream port 124 is connected to downstream pipes and upstream port 300 is connected to upstream pipes). Valve 110, such as a ball valve, may allow an operator to withdraw a sample of fluid from gate valve assembly 100 during inspection or maintenance and may secure to fitting 302 (FIG. 3). Downstream port 124 and upstream port 300 may be sized and shaped for connection to downstream and upstream pipeline components, and may include a series of bolt holes to allow ports 124 and 300 to facilitate leak-free connections to these components.

Figure 6:
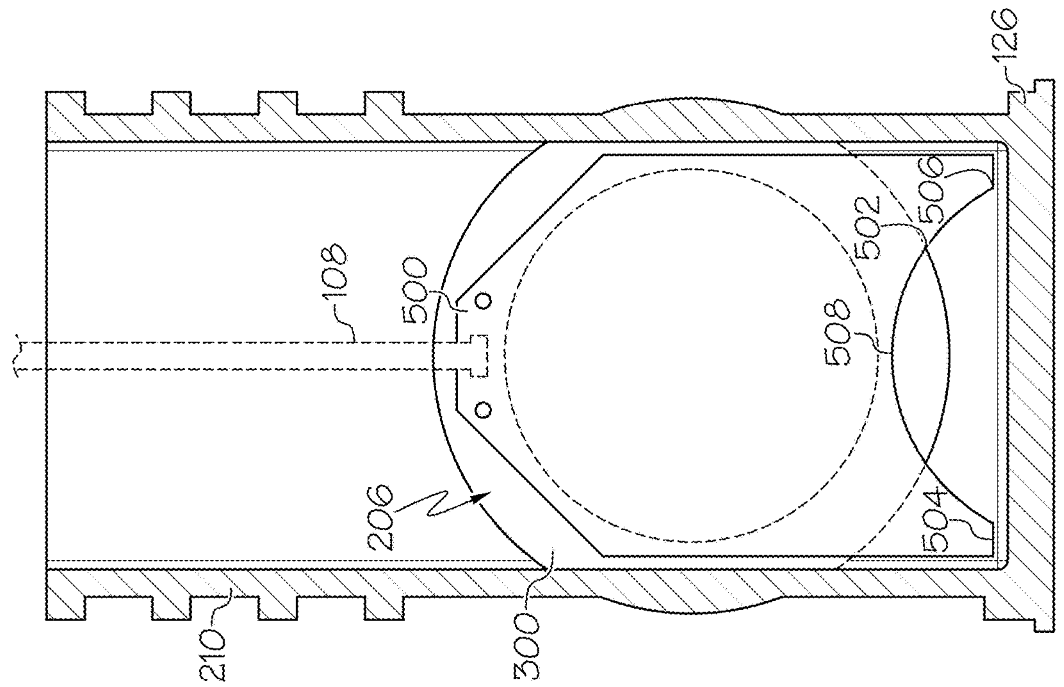
FIG. 6 is a cross-sectional view along line IV-IV of FIG. 3 with a gate in a closed position according to an aspect of the present disclosure.

Stem 108 may be sized and shaped for connection to an actuation system (not shown) to electronically or manually move the gate 206 between an open position (FIG. 5) and a closed position (FIG. 6). The actuation system may be any actuation system known in the art to assist in actuating a gate, ball, flapper, etc. in a valve. The actuation system may include a handwheel that facilitates manual actuation of gate 206. For example, the actuation system may include an internally-threaded handwheel that, when manually operated, raises and lowers gate 206 to move gate 206 between an open position and a closed position, respectively. In some configurations, the actuation system may instead include a pneumatic control device configured to selectively position gate 206 in the open position and the closed position. One or more controllers (not shown) may monitor states of a pipeline, such as fluid pressure upstream and/or downstream of gate valve system 100. In response to detected states (e.g., a drop or increase in pressure below or above respective predetermined threshold values), the controller may actuate stem 108 and gate 206 so as to block or permit flow of fluid between downstream end 202 and upstream end 204, as desired, by introducing or removing air to the pneumatic control device.

Bonnet 104 may be secured to body 102 such that stem 108 extends through bonnet 104. Bonnet 104 may be secured to body 102 in any suitable manner. For example, bonnet 104 may receive a plurality of fasteners 116, such as bolts, and a respective plurality of fixing members such as nuts. An upper plate 134 may form a flange positioned above bonnet 104 so as to extend proximally away from body 102 toward a proximal end of stem 108. A packing injection fitting 224 (FIG. 2A) may be provided on bonnet 104 to facilitate insertion of packing material for sealing stem 108. Upper plate 134 and stem 108 may be provided at a central portion of gate valve system 100 between downstream end 202 and upstream end 204. A vent 112 may also be provided on bonnet 104 to facilitate venting of pressure for manual pressure release and/or in case of an emergency.

Bonnet 104 may be secured to body 102 via an O-ring and a gasket. Specifically, to prevent leaks from the top end of gate valve assembly 100, an interface between a body-facing surface of bonnet 104 and an opposite surface of body 102 may be sealed by an O-ring and a gasket. To further prevent leaks at the top end of gate valve assembly 100, a packing assembly may be provided so as to surround stem 108. The packing assembly may include a lantern ring sandwiched between packing material positioned proximally and distally of the lantern ring. The packing material may be material that was introduced through packing injection fitting 224 (FIG. 2A), for example. The packing assembly may be configured to form a seal that prevents leaks from traveling toward the proximal end of stem 108, without introducing a significant amount of resistance to the motion of stem 108 in a vertical direction.

Body 102 and bonnet 104 may be formed of any suitable material. For example, body 102 and bonnet 104 may be formed of corrosion-resistant materials. In particular, body 102 and bonnet 104 may be formed of a metal material, such as stainless steel (e.g., 17-4 stainless steel), carbon steel, etc. Moreover, to assist in force distribution due to the dimensions of body 102, the one or more ribs 114 are protrusions formed on the outer surface of body 102 that circumferentially surround body 102. Because gate valve assembly 100 may be used in environments that have high pressures and/or strict dimension requirements, one or more ribs 114 provide additional structural support, stiffness, and durability as gate valve assembly 100 may have thin walls and/or have a short downstream end 202 to upstream end 204 length.

FIG. 2A is a cross-sectional view along line IIA-IIA of FIG. 1. As shown in FIG. 2A, gate 206 may be moveably secured within a hollow interior of body 102. Gate 206 may include a downstream surface 226 facing downstream end 202 and an upstream surface 228 facing upstream end 204. Gate 206 may be coupled to stem 108 at coupling 222, stem 108 including a proximal end protruding through upper plate 134 of bonnet 104, bonnet 104, and top portion 128 of body 102 and a distal end fixed to gate 206 at coupling 222. The proximal end of stem 108, which corresponds to the upper end of stem 108 as shown in FIG. 2A, may be operably connected to an actuation system as previously described.

Figure 2B:
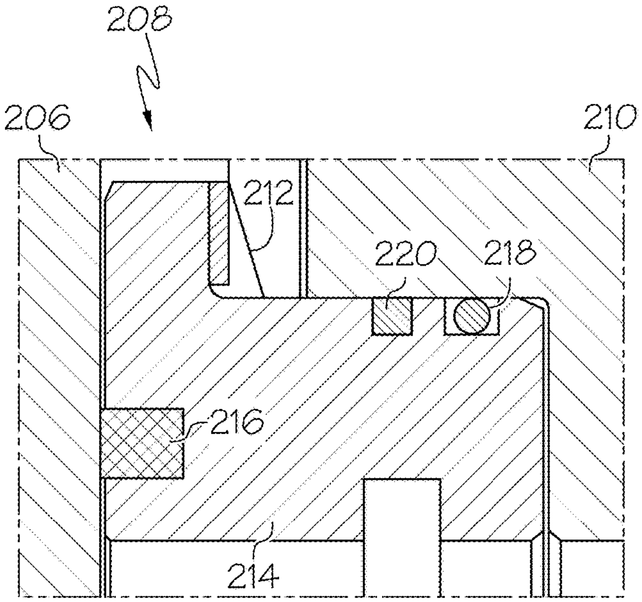
FIG. 2B is a detail view of Detail IIB of FIG. 2B.

FIG. 2B is a detailed view of IIB of FIG. 2B. A right, top corner portion of FIG. 2B may correspond to a portion of the walls 210 of body 102. A left portion of FIG. 2B may correspond to a portion of gate 206. Seat assembly 208 may include a wave spring 212, a seat 214, seat insert 216, one or more O-rings 218, and one or more packing ropes 220. As seen, gate 206 may abut against an inner surface of seat assembly 208. Specifically, gate 206 may abut against a seat insert 216. Seat insert 216 may be formed of any suitable material (e.g., nylon, reinforced polytetrafluoroethylene, devlon, etc.) configured to form a seal with a portion of gate 206. Seat insert 216 may be of a non-metal material to provide a metal-to-non-metal contact. Seat insert 216 may be disposed in a cavity of a seat 214 such that seat 214 surrounds seat insert 216. Seat 214 may form a secondary seal with gate 206. Seat 214 may then be formed of a metal material to provide a metal-to-metal contact in situations where insert 216 is worn, removed, or damaged.

Gate 206 may be positioned between downstream end 202 and upstream end 204 within body 102 such that, when in a closed position, gate 206 closes flow path 130 and separates downstream end 202 from upstream end 204 (e.g., downstream end 202 is no longer in fluid communication with upstream end 204 when in the closed position). Seat assembly 208 may contact gate 206 on both the downstream end 202 and the upstream end 204. Thus, there may be more than one seat assembly 208 in gate valve assembly 100. In other words, valve seats or seat rings may be secured within body 102 so as to face and abut downstream end 202 and upstream end 204 of gate 206. Seat assembly 208 may be removably secured to body 102, e.g., by threading or by press-fitting. Alternatively, seat assembly 208 may be permanently secured to body 102 by welding. In an aspect of the invention, seat assembly 208 provides a single piston effect on both sides of gate 206. In another aspect, seat assembly 208 provides a double piston effect on both sides of gate 206. In yet another aspect, seat assembly 208 may provide a single piston effect on one side of gate 206 and a double piston effect on the other side of gate 206.

Seat assembly 208 may be secured within body 102 with one or more seat seals 218. The one or more seat seals 218 may be O-rings or any suitable seat seal. For example, one or more seat seals 218 may be formed by one or more suitable sealing mechanisms, such as O-rings, ring seals, etc. One or more packing ropes 220 may additionally assist in sealing. Specifically, one or more packing ropes 220 may be flexible to assist in sealing while gate valve assembly 100 is under high pressure and/or high temperature environments. One or more packing ropes 220 may be any type of suitable material such as PTFE, graphite, aramid fiber, carbon fiber, nylon, etc. Seat assembly 208 may be configured to receive sealant supplied via one or more injection or sealant paths.

Wave spring 212 may provide a return force that allows gate valve assembly 100 to actuate gate 206 under pressurized conditions. In an aspect, wave spring 212 energizes seat assembly 208 such that gate valve assembly 100 has double block and bleed (DBB) capabilities (e.g., each of seat assembly 208 provided on downstream end 202 and upstream end 204 is a single piston effect seat that seals the pressure from both ends). Wave spring 212 may keep the seat assembly 208 against the gate 206 when open and/or closed to not only keep seat assembly 208 centered but also to keep the seat seals energized for upstream sealing. Wave spring 212 may be made of steel, copper, or any other suitable metal, and may have a finishing to make wave spring 212 more resistant to corrosion and/or other types of wear. Wave spring 212 may be a wave disc, a split wave disc (e.g., a wave disc with a gap, creating a first end and a second end of the wave spring), a curved disc, a notched disc, or a stacked wave disc. Additionally, wave spring 212 may not be a wave spring but rather any other type of spring member suitable for such an application (e.g., wave spring 212 may be any force damper). For example, wave spring 212 may be a coil spring.

A first surface of wave spring 212 may contact seat 214 while a second surface opposite to the first surface may contact walls 210. In other words, wave spring 212 may be positioned between seat 214 and walls 210 to provide a spring force. The width of wave spring 212 may thus define a recess (e.g., a gap) between seat 214 and walls 210. Under pressure, wave spring 212 may compress, reducing the width of wave spring 212 and consequently reducing the gap between seat 214 and walls 210. In this way, wave spring 212 may assist in counteracting forces against seat assembly 208 that push seat assembly 208 away from gate 206. Both the seat assembly 208 provided on the downstream side and the upstream side of gate 206 may include a wave spring 212 such that the wave springs 212 push the opposing seat assemblies 208 towards each other and away from the respective ends 202 and 204 (e.g., the wave springs 212 bias the downstream seat assembly 208 towards gate 206 and bias the upstream seat assembly 208 towards gate 206).

Figure 5:
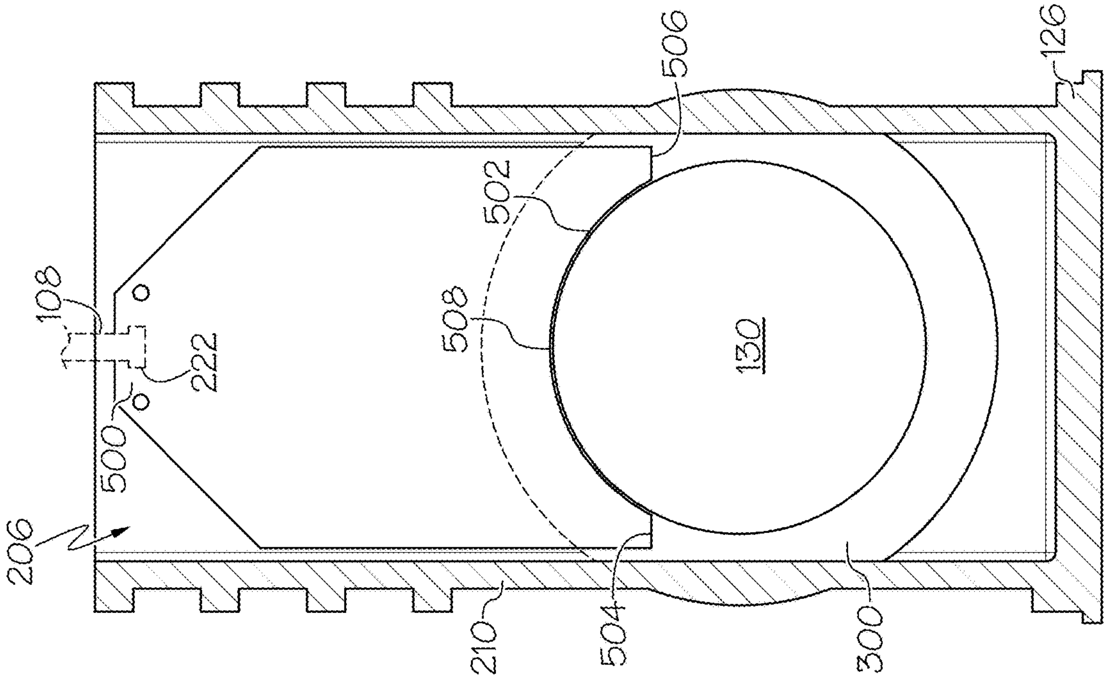
FIG. 5 is a cross-sectional view along line IV-IV of FIG. 3 with a gate in an open position according to an aspect of the present disclosure.

Gate 206, when under pressure from one end of gate valve assembly 100, may shift to the other side. Seat assembly 208 via wave spring 212 provides a spring force against gate 206 to keep it in place and provide proper sealing. As seen in FIGS. 5 and 6, gate 206 may have a first leg 504 and a second leg 506 that keep gate 206 in contact with seat assembly 208 at and between the open (FIG. 5) and closed (FIG. 6) positions.

FIG. 3 is a side view of the gate assembly 100 of FIG. 1. Gate valve assembly 100 includes an annular flange or upstream port 300 at the upstream end 204 and an annular flange or downstream port 124 at downstream end 202. Valve fitting 302 provides an interface between body 102 and valve 110. As seen in FIG. 3, body 102 (and gate valve assembly 100) may be substantially taller than it is thick (or wide). In other words, body 102 may be formed such that the distance from downstream end 202 to upstream end 204 (e.g., the thickness of body 102 shown as T in FIG. 3) is much smaller than the distance from base portion 126 to top portion 128 (e.g., the height of body 102 shown as H in FIG. 3). In an aspect, the height H of body 102 is two times larger than the thickness T of body 102. In an aspect, the height H of body 102 is five times larger than the thickness of the base portion 126 of body 102, or more. In an aspect, the height H of body 102 is ten times larger than the thickness of the base portion 126 of body 102, or more. In an aspect, the height H of body 102 is 15 times larger than the thickness of the base portion 126 of body 102, or more.

Figure 4:
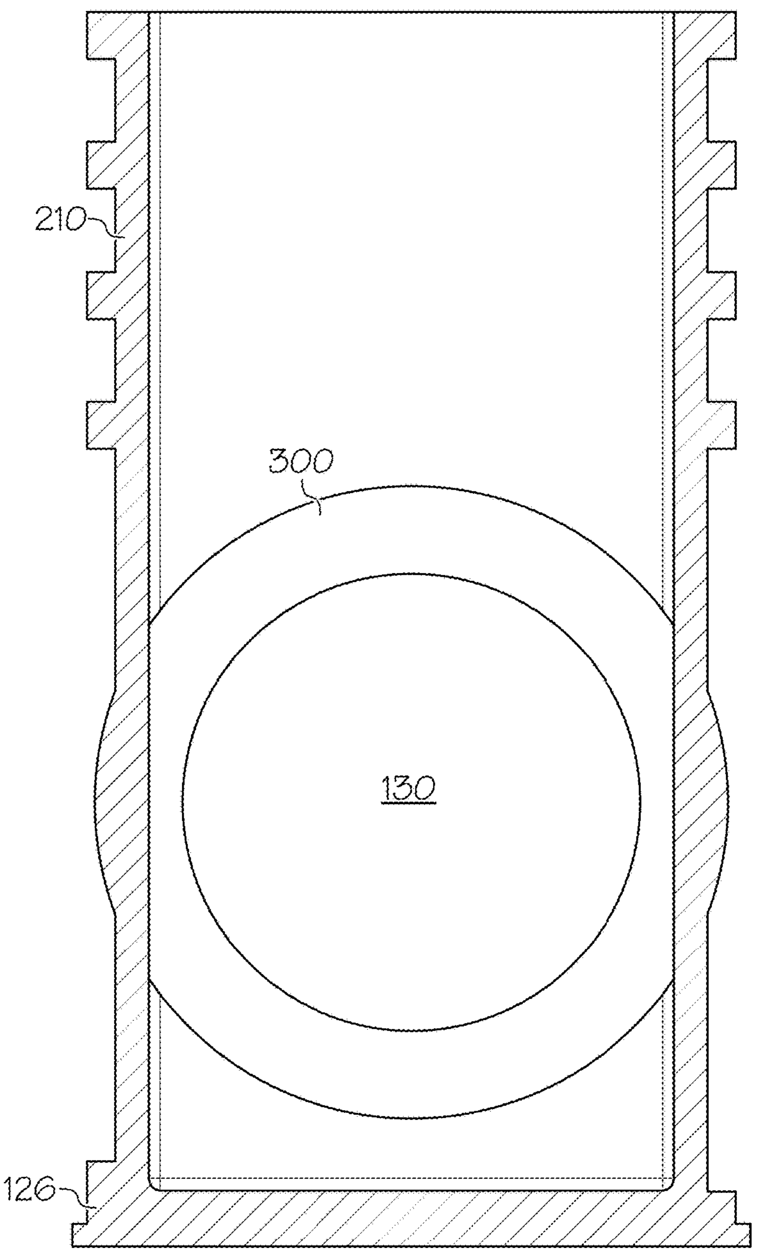
FIG. 4 is a cross-sectional view along line IV-IV of FIG. 3.

FIG. 4 is a cross-sectional view along line IV-IV of FIG. 3. As previously described, walls 210 at least partially surround an inner cavity of body 102 with a circular opening that defines flow path 130. Annular flange or upstream port 300 and annular flange or downstream port 124 surround this opening, thus creating the flow path 130 from upstream end 204 to downstream end 202.

FIG. 5 is a cross-sectional view along line IV-IV of FIG. 3 with a gate 206 in an open position, according to an aspect of the present disclosure. Gate 206 may include top end 500 that interfaces with stem 108. Top end 500 may provide coupling 222 in the form of a cutout within top end 500. The cutout, as seen in FIG. 5, may be shaped to allow the end portion of stem 108 to be fixed in top end 500 of gate 206 in a horizontal direction without the stem 108 being removable by motion in a vertical direction. In the open position, gate 206 is stored substantially above flow path 130. However, a portion of gate 206 may extend around flow path 130. Specifically, gate 206 may have a bottom end 502 that is shaped by a first portion (e.g., first leg 504 having a curved portion, a flat bottom surface, and a flat lateral side), a second portion (e.g., second leg 506 having a curved portion, a flat bottom surface, and a flat lateral side), and an arc portion 508 between first leg 504 and second leg 506. Arc portion 508 may have a radius substantially similar to flow path 130. In some embodiments, this radius of curvature is constant along an entirety of arc portion 508. In this way, first leg 504 and second leg 506 extend past (but around and not within) flow path 130. No portion of gate 206 is within flow path 130 in the fully open position since arc portion 508 is shaped to allow first leg 504, second leg 506, and arc portion 508 to partially surround the perimeter of flow path 130. The arc portion 508 may be formed by a circular cutout with a mid-point below the bottom end 502 and in a center-plane of the gate 206. The circular cutout may additionally have a diameter smaller than a length of the gate 206 and larger than or equal to a diameter of the flow path 130. The distance from the outer circumference of flow path 130 to the base portion 126 of body 102 may be less than the radial distance defined by the center of flow path 130 to the outer circumference of the flow path 130.

In at least some systems or methods, a gate fully surrounds the flow path with a circular cutout inside of the gate enclosing a portion of the flow path. In these systems, the gate has a "slab" portion and a "cutout" portion of similar dimensions (e.g., the slab portion blocks the flow path in the closed position and the cutout portion opens the flow path in the open positon, therefore both are sized with dimensions that are larger than or nearly the same as the flow path) causing the body of the gate system to have unnecessary space to house the gate in both the open and closed positions. The exemplary gate 206, in contrast, may be shaped in a way that allows valve systems to significantly reduce the extra, unnecessary space provided for the gate. For example, when in the open position, gate 206 may not entirely surround the circumference (e.g., periphery) of the flow path 130. Instead, gate 206 may only surround half, a quarter, or any portion of the circumference of flow path 130.

Even with the compact shape of gate 206, first leg 504 and second leg 506 may maintain contact with one or more seat assemblies 208 in the open position so the one or more seat assemblies 208 do not shift and cause gate valve assembly 100 to improperly seal. First leg 504 and second leg 506 hold one or more seat assemblies 208 back within their respective pockets during a fully open position. Thus, gate 206 continually contacts one or more seat assemblies 208 from the fully closed to fully open position which provides a return force on one or more seat assemblies 208 so they do not shift and slip out of their pockets.

FIG. 6 is a cross-sectional view along line IV-IV of FIG. 3 with a gate in a closed position according to an aspect of the present disclosure. The geometric shape of gate 206 allows gate valve assembly 100 to fit within systems that have minimal dimensional tolerance because there is little distance needed between the base portion 126 of body 102 and the flow path 130 since wave spring 212 keeps seat assembly 208 energized and in place. As seen in FIG. 6, gate 206 entirely blocks flow path 130 in the fully closed position, separating downstream end 202 from upstream end 204 without gate 206 needing to extend substantially past (e.g., below in FIG. 6) flow path 130. In other configurations, gate valve assembly 100 includes a relatively large "pocket" (e.g., distance between a base portion of the body and the flow path of the body) to house the bottom end of a gate in the previously-described closed position. However, the configuration of the present disclosure provides a gate that extends minimally past the end of the flow path 130, seen in FIG. 6. Instead of providing bottom end 502 that entirely surrounds flow path 130 when in the open position like other configurations, gate 206 surrounds only a small portion of flow path 130 in the open position so, when in the closed position, only a small section of gate 206 (e.g., first leg 504, second leg 506, and arc portion 508) occupies space below flow path 130 within the inner cavity of body 102. Gate 206 may surround less than 75%, less than 66%, less than 50%, less than 33%, or less than 25% of the periphery of the flow path in the open position.

Figure 7:
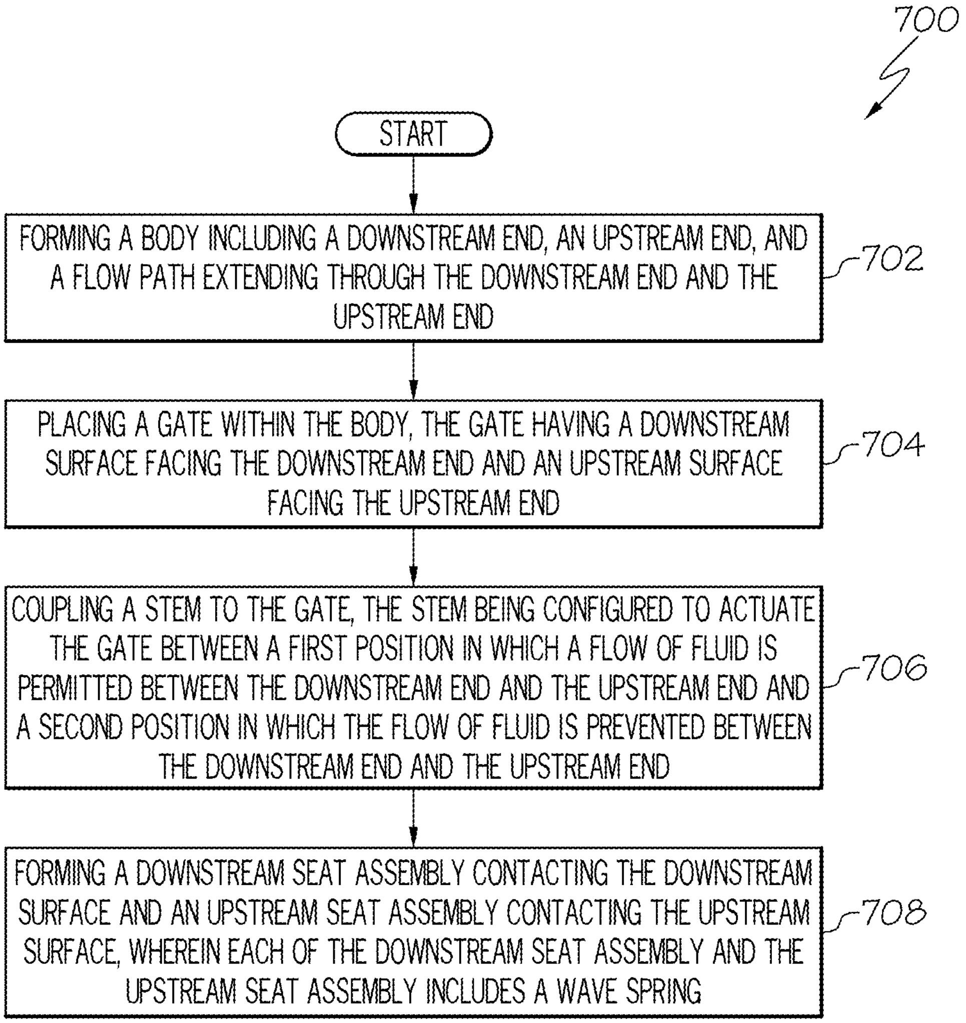
FIG. 7 is a flow chart according to aspects of the present disclosure.

FIG. 7 is a flow chart 700 according to aspects of the present disclosure. Flow chart 700 may correspond to a method of assembling a gate valve system, such as gate valve assembly 100.

Step 702 may include forming a body (e.g., body 102) with a downstream end (e.g., downstream end 202), an upstream end (e.g., upstream end 204), and a flow path (e.g., flow path 130) extending through the downstream end and the upstream end. The body may be formed in any way known in the art, such as casting, forging, machining, or any combination thereof. The body may be formed with ribs (e.g., one or more ribs 114) around an outer surface to assist in dispersing forces.

Step 704 may include placing a gate (e.g., gate 206) within the body. The gate may have a downstream surface (e.g., downstream surface 226) facing the downstream end and an upstream surface (e.g., upstream surface 228) facing the upstream end. The gate may be substantially centered in the body such that the distance from the downstream end to the downstream surface is the same or substantially the same as the distance from the upstream end to the upstream surface.

Step 706 may include coupling a stem (e.g., stem 108) to the gate. The stem may actuate the gate between a first position in which a flow of fluid is permitted between the downstream end and the upstream end and a second position in which the flow of fluid is prevented between the downstream end and the upstream end. Specifically, the stem may be coupled to a top end (e.g., top end 500) of the gate via a coupling (e.g., coupling 222). The gate may only partially surround a periphery of the flow path when in the first position. The first positon may be a positon such that the flow path is entirely open and no portion of the gate blocks the flow path.

Step 708 may include forming a downstream seat assembly (e.g., seat assembly 208) contacting the downstream surface and an upstream seat assembly (e.g., seat assembly 208) contacting the upstream surface. Each of the downstream seat assembly and the upstream seat assembly may include a wave spring (e.g., wave spring 212). Each seat assembly may further include a seat (e.g., seat 214), a seat insert (e.g., seat insert 216), a seal (e.g., one or more seat seals 218), and packing (e.g., one or more packing ropes 220).

It will be apparent to those skilled in the art that modifications may be made in the disclosed systems and methods without departing from the scope of the disclosure. Other aspects of the disclosure will be apparent to those skilled in the art from consideration of the specification and practice of the features disclosed herein. It is intended that the specification and embodiments be considered as exemplary only.

What is claimed is:

1. A gate valve system, comprising:
- a body including:
  - a downstream end;
  - an upstream end; and
  - a flow path extending through the downstream end and the upstream end;
- a gate extending within the body with a downstream surface facing the downstream end and an upstream surface facing the upstream end, the gate including a first leg and a second leg;
- a stem secured to the gate and configured to actuate the gate between a first position in which a flow of fluid is permitted between the downstream end and the upstream end and a second position in which the flow of fluid is prevented; and
- a downstream seat assembly contacting the downstream surface and an upstream seat assembly contacting the upstream surface,
- wherein each of the downstream seat assembly and the upstream seat assembly includes a spring member, the first leg being in contact with the downstream seat assembly and with the upstream seat assembly when the gate is at the first position and when the gate is at the second position, and
- wherein a distance from an outer circumference of the flow path to a bottom surface of the body is less than a radial distance defined by a center of the flow path to the outer circumference of the flow path.

2. The gate valve system of claim 1, wherein an outer surface of the body includes one or more ribs surrounding the body.

3. The gate valve system of claim 1, further comprising:
- a yoke, the yoke being removable while the gate valve system is in service.

4. The gate valve system of claim 1, each of the downstream seat assembly and the upstream seat assembly further comprising:
- a seat;
- a seat insert configured to contact the gate and prevent contact between the gate and the seat; and
- an O-ring.

5. The gate valve system of claim 1, wherein the spring member of the upstream seat assembly is a stacked wave disc wave spring and the spring member of the downstream seat assembly is a stacked wave disc wave spring.

6. The gate valve system of claim 1, wherein the gate surrounds less than 50% of a periphery of the flow path when in the first position.

7. The gate valve system of claim 1, wherein the first leg and the second leg each face toward a bottom end of the body, the first leg and the second leg extending beyond the flow path in a direction toward the bottom end of the body when the gate is in the second position.

8. A gate valve system, comprising:
- a body including:
  - a downstream end;
  - an upstream end; and
  - a flow path extending through the downstream end and the upstream end;
- a gate extending within the body with a downstream surface facing the downstream end and an upstream surface facing the upstream end;
- a stem secured to the gate and configured to actuate the gate between a first position in which a flow of fluid is permitted between the downstream end and the upstream end and a second position in which the flow of fluid is prevented between the downstream end and the upstream end, wherein an entire flow path at the downstream end is in fluid communication with the entire flow path at the upstream end in the first position; and
- a downstream seat assembly contacting the downstream surface and an upstream seat assembly contacting the upstream surface at and between the first position and the second position;
- wherein the gate only partially surrounds the flow path in the first position, and wherein a distance from an outer circumference of the flow path to a bottom surface of the body is less than a radial distance defined by a center of the flow path to the outer circumference of the flow path.

9. The gate valve system of claim 8, wherein the gate extends from a top end to a bottom end, wherein the stem is secured to the gate at the top end, and wherein the bottom end includes a first portion that is straight, a second portion that is straight, and an arc portion that is curved between the first portion and the second portion.

10. The gate valve system of claim 8, wherein an outer surface of the body includes one or more ribs surrounding the body.

11. The gate valve system of claim 8, each of the downstream seat assembly and the upstream seat assembly including:

a wave spring;

a seat insert configured to contact the gate;

a seat configured to contact the gate at least when the seat insert is not present;

a seal; and packing material.

12. The gate valve system of claim 11, wherein the gate valve system is a double block and bleed valve system.

13. The gate valve system of claim 11, wherein the packing material of the downstream seat assembly is made of graphite and the packing material of the upstream seat assembly is made of graphite.

14. A method of assembling a gate valve system, the method comprising:

forming a body including a downstream end, an upstream end, and a flow path extending through the downstream end and the upstream end;

placing a gate within the body, the gate having;

a downstream surface facing the downstream end;

an upstream surface facing the upstream end;

coupling a stem to the gate, the stem being configured to actuate the gate between a first position in which a flow of fluid is permitted between the downstream end and the upstream end and a second position in which the flow of fluid is prevented between the downstream end and the upstream end; and forming a downstream seat assembly contacting the downstream surface and an upstream seat assembly contacting the upstream surface, wherein each of the downstream seat assembly and the upstream seat assembly includes a wave spring, and wherein a distance from an outer circumference of the flow path to a bottom surface of the body is less than a radial distance defined by a center of the flow path to the outer circumference of the flow path.

15. The method of claim 14, wherein the entire flow path at the downstream end is in fluid communication with the entire flow path at the upstream end in the first position, and wherein the gate partially surrounds a perimeter of the flow path in the first position.

16. The method of claim 14, wherein an outer surface of the body includes one or more ribs surrounding the body.

17. The method of claim 16, the method further comprising:

forming a yoke, the yoke being removable while the gate valve system is in service.

18. The method of claim 17, each of the downstream seat assembly and the upstream seat assembly further comprising:

a seat insert configured to contact the gate;

a seat configured to contact the gate at least when the seat insert is not present;

an O-ring; and packing ropes.

* * * * *